(12) United States Patent
Kawakami et al.

(10) Patent No.: US 12,553,400 B2
(45) Date of Patent: Feb. 17, 2026

(54) ELECTROMAGNETIC VALVE DRIVING DEVICE (71) Applicant: Hitachi Astemo, Ltd., Hitachinaka (JP)

(72) Inventors: Daichi Kawakami, Hitachinaka (JP); Noriaki Sumisha, Hitachinaka (JP); Junpei Kogawa, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/836,144

(22) PCT Filed: Mar. 3, 2022

(86) PCT No.: PCT/JP2022/009145
§ 371 (c)(1),
(2) Date: Aug. 6, 2024

(87) PCT Pub. No.: WO2023/166665
PCT Pub. Date: Sep. 7, 2023

(65) Prior Publication Data
US 2025/0137415 A1  May 1, 2025

(51) Int. Cl.
F02D 41/24 (2006.01)
F02D 41/20 (2006.01)
F02M 51/06 (2006.01)

(52) U.S. Cl.
CPC ....... *F02D 41/2467* (2013.01); *F02M 51/061* (2013.01); *F02D 2041/2003* (2013.01); *F02D 2041/2055* (2013.01)

(58) Field of Classification Search
CPC ..... F02D 2041/2055; F02D 2041/2003; F02D 41/2467; F02M 51/061
See application file for complete search history.

(56) References Cited

U.S. PATENT DOCUMENTS 5,402,760 A     4/1995  Takeuchi et al.
2019/0055896 A1  2/2019  Horiuchi et al.
(Continued)

FOREIGN PATENT DOCUMENTS

DE    102013211469 A1   12/2014
DE    102018221435 A1    6/2019
(Continued)

OTHER PUBLICATIONS

International Search Report for International Application No. PCT/JP2022/009145; Mailed May 17, 2022.
(Continued)

Primary Examiner — Kevin A Lathers
(74) Attorney, Agent, or Firm — CANTOR COLBURN LLP (57) ABSTRACT An electromagnetic valve driving device that controls an energization period to a solenoid coil provided in a fuel injection valve and causes the fuel injection valve to inject fuel a plurality of times during one combustion cycle of an internal combustion engine, the electromagnetic valve driving device includes: a storage that stores a correction amount map indicating a relationship between an energization pause period from a completion time of a first-half energization period, which is the energization period for a first fuel injection in the one combustion cycle, to a start time of a later-half energization period, which is the energization period for next fuel injection, and a correction amount for the later-half energization period; an energization period correction unit that obtains the correction amount from a command value of the energization pause period based on the correction amount map and corrects the later-half energization period based on the obtained correction amount; and an energization controller that energizes the solenoid coil based on a later-half correction energization period that
(Continued)

is the later-half energization period corrected by the energization period correction unit.

6 Claims, 5 Drawing Sheets

(56) References Cited

U.S. PATENT DOCUMENTS

2019/0120167 A1  4/2019  Satake et al.
2019/0242323 A1  8/2019  Nishigaki

FOREIGN PATENT DOCUMENTS

| JP | H06101552 A | * | 4/1994 |
| JP | 2004293381 A | | 10/2004 |
| JP | 2017096118 A | | 6/2017 |
| JP | 2017201160 A | | 11/2017 |
| JP | 2018096275 A | | 6/2018 |
| JP | 2019167832 A | | 10/2019 |

OTHER PUBLICATIONS

PCT Written Opinion of the International Search Authority for International Application No. PCT/JP2022/009145; Mailed May 17, 2022.
EPO Extended European Search Report for corresponding EP Application No. 22929810.4; Issued Dec. 2, 2025.

* cited by examiner

| Tp1 | Tp2 | Tp3 | ... | Tpn |
|-----|-----|-----|-----|-----|
| xx  | xx  | xx  | ... | xx  |

|  | Tp1 | Tp2 | Tp3 | ... | Tpn |
|---|---|---|---|---|---|
| FIRST-HALF ENERGIZATION PERIOD Tia1 | XX | XX | XX | ... | XX |
| FIRST-HALF ENERGIZATION PERIOD Tia2 | XX | XX | XX | ... | XX |
| ⋮ | ⋮ | ⋮ | ⋮ | ⋮ | ⋮ |
| FIRST-HALF ENERGIZATION PERIOD Tian | XX | XX | XX | XX | XX |

ELECTROMAGNETIC VALVE DRIVING DEVICE

CROSS REFERENCE TO RELATED APPLICATIONS

This is the U.S. national stage of application No. PCT/JP2022/009145, filed on Mar. 3, 2022, the entire content of which is incorporated herein by reference.

TECHNICAL FIELD

The present invention relates to an electromagnetic valve driving device.

BACKGROUND ART

For example, PTL 1 discloses a fuel injection control device. The fuel injection control device is applied to a fuel injection system capable of executing multi-stage injection in which fuel is injected a plurality of times in a combustion cycle. The fuel injection control device disclosed in PTL 1 calculates a magnetic flux remaining in a fuel injection valve, and corrects an injection mode of later-half injection based on the calculated residual magnetic flux. In addition, the fuel injection control device disclosed in PTL 2 estimates a residual voltage of the solenoid coil of the fuel injection valve, and corrects a valve opening period based on the estimated residual voltage.

CITATION LIST

Patent Document

[Patent Document 1]
Japanese Unexamined Patent Application, First Publication No. 2018-96275
[Patent Document 2]
Japanese Unexamined Patent Application, First Publication No. 2017-96118

SUMMARY OF INVENTION

Technical Problem

However, in the fuel injection control device disclosed in PTL 1, it is necessary to perform an arithmetic operation for calculating the residual magnetic flux. In the fuel injection device disclosed in PTL 2, it is necessary to perform the arithmetic calculation for estimating the residual voltage. A large number of combustion cycles are performed in a short period in an internal combustion engine. For this reason, as in the fuel injection control devices disclosed in PTL 1 and PTL 2, the performance of a large number of arithmetic operations within the combustion cycle greatly increases a load of the arithmetic operation of the fuel injection control device.

The present invention has been made in view of the above-described problems, and an object of the present invention is to prevent the increase in the load of arithmetic operation due to correction regarding the fuel injection in the electromagnetic valve driving device that injects fuel into the fuel injection valve a plurality of times during one combustion cycle of the internal combustion engine.

Solution to Problem

The present invention adopts the following configuration as means for solving the above problems.

A first aspect of the present invention is an electromagnetic valve driving device that controls an energization period to a solenoid coil provided in a fuel injection valve and causes the fuel injection valve to inject fuel a plurality of times during one combustion cycle of an internal combustion engine, the electromagnetic valve driving device including: a storage that stores a correction amount map indicating a relationship between an energization pause period from a completion time of a first-half energization period, which is the energization period for a first fuel injection in the one combustion cycle, to a start time of a later-half energization period, which is the energization period for next fuel injection, and a correction amount for the later-half energization period; an energization period correction unit that obtains the correction amount from a command value of the energization pause period based on the correction amount map and corrects the later-half energization period based on the obtained correction amount; and an energization controller that energizes the solenoid coil based on a later-half correction energization period that is the later-half energization period corrected by the energization period correction unit.

According to a second aspect of the present invention, in the first aspect, the fuel injection valve includes a movable core that is moved by energization to the solenoid coil and a fixed core that abuts on the movable core at a maximum movement position of the movable core, the storage stores, as the correction amount map, a maximum drive correction amount map indicating a relationship between the energization pause period and the correction amount when maximum drive in which the movable core abuts on the fixed core is performed in one fuel injection, and the energization period correction unit obtains the correction amount from the command value of the energization pause period based on the maximum drive correction amount map when the fuel injection based on the first-half energization period and the fuel injection based on the later-half energization period are the maximum drive.

According to a third aspect of the present invention, in the first or second aspect, the fuel injection valve includes the movable core that is moved by the energization to the solenoid coil and the fixed core that abuts on the movable core at the maximum movement position of the movable core, the storage stores, as the correction amount map, an intermediate drive correction amount map indicating the relationship between the energization pause period and the correction amount when intermediate drive in which the movable core is not moved until abutting on the fixed core is performed in one fuel injection, and the energization period correction unit obtains the correction amount from the command value of the energization pause period based on the intermediate drive correction amount map when the fuel injection based on the first-half energization period and the fuel injection based on the later-half energization period are the intermediate drive.

According to a fourth aspect of the present invention, in the first aspect, the fuel injection valve includes a movable core that is moved by energization to the solenoid coil and a fixed core that abuts on the movable core at a maximum movement position of the movable core, the storage stores, as the correction amount map, a maximum drive correction amount map indicating a relationship between the energization pause period and the correction amount when maximum drive in which the movable core abuts on the fixed core is performed in one fuel injection and an intermediate drive correction amount map indicating the relationship between the energization pause period and the correction amount when intermediate drive in which the movable core is not moved until abutting on the fixed core is performed in one fuel injection, and the energization period correction unit determines whether the fuel injection is the maximum drive or the intermediate drive, obtains the correction amount from the command value of the energization pause period based on the maximum drive correction amount map when the fuel injection based on the first-half energization period and the fuel injection based on the later-half energization period are the maximum drive, and obtains the correction amount from the command value of the energization pause period based on the intermediate drive correction amount map when the fuel injection based on the first-half energization period and the fuel injection based on the later-half energization period are the intermediate drive.

According to a fifth aspect of the present invention, in the third or fourth aspect, the intermediate drive correction amount map indicates a relationship between the energization pause period and the correction amount according to the first-half energization period, and the energization period correction unit obtains the correction amount from the command value of the first-half energization period and the command value of the energization pause period.

According to a sixth aspect of the present invention, in any one of the first to fifth aspects, the electromagnetic valve driving device further includes a valve closing detector that detects valve closing of the fuel injection valve, in which the energization period correction unit calculates a difference between an estimated valve closing time obtained from the later-half correction energization period and a valve closing detection time obtained by the valve closing detector, and further corrects the later-half correction energization period after the calculation of the difference.

According to a seventh aspect of the present invention, in any one of the first to sixth aspects, the energization pause period and the correction amount are associated with each other such that valve closing timing in the next fuel injection is set earlier according to valve opening timing being set earlier in the next fuel injection caused by at least one of residual magnetic force due to an influence of the first fuel injection and an increase in an execution boosting voltage.

Advantageous Effects of Invention

According to the present invention, the storage stores the correction amount map indicating the relationship between the energization pause period and the correction amount in the later-half energization period. The correction amount in the later-half energization period is obtained from the command value in the energization pause period based on the correction amount map. For this reason, in the present invention, the load of the arithmetic operation is reduced as compared with the case of obtaining the correction amount in the later-half energization period without using the correction amount map. Consequently, according to the present invention, the increase in the load of the arithmetic operation due to the correction regarding the fuel injection can be prevented in the electromagnetic valve driving device that injects the fuel into the fuel injection valve a plurality of times during one combustion cycle of the internal combustion engine.

DESCRIPTION OF EMBODIMENT

Hereinafter, an embodiment of an electromagnetic valve driving device according to the present invention will be described with reference to the drawings.

Figure 1:
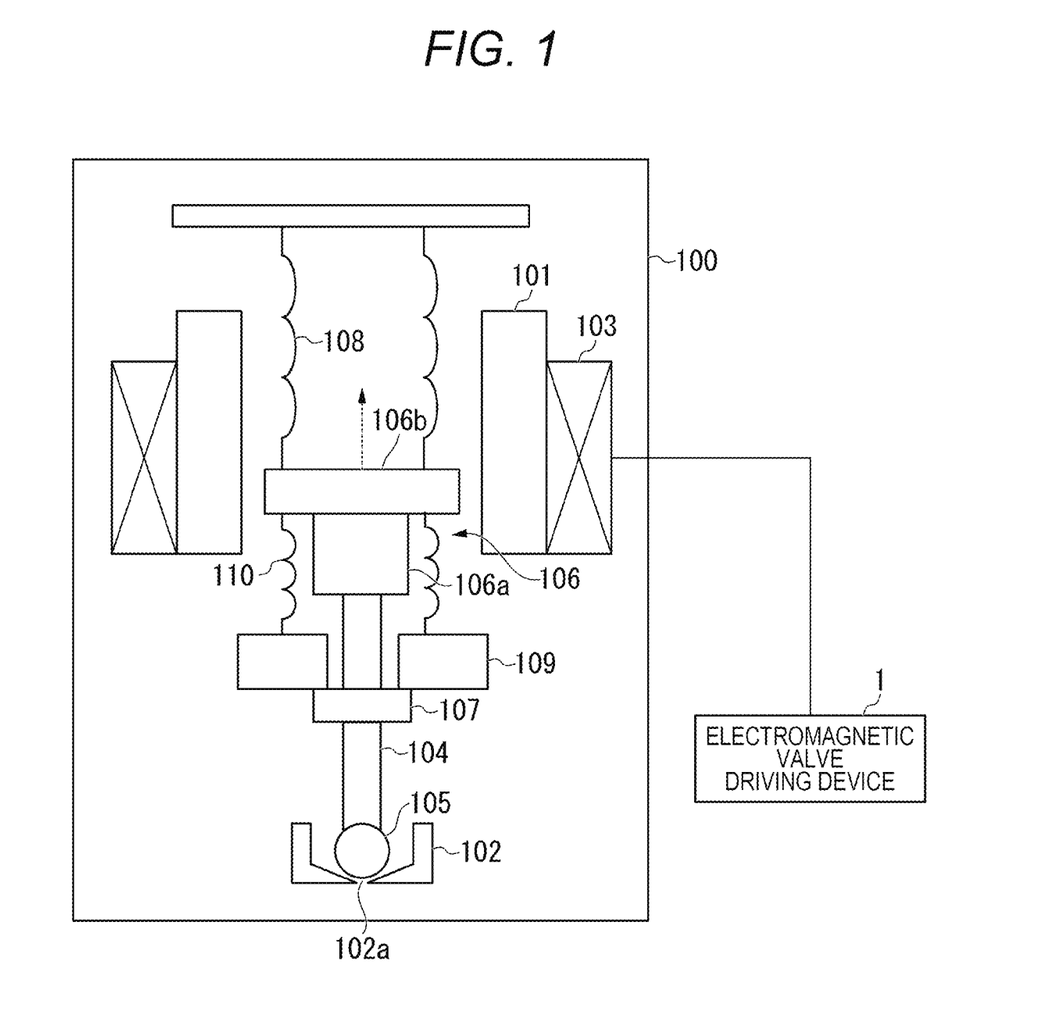
FIG. 1 is a schematic diagram illustrating a schematic configuration of a fuel injection valve controlled by an electromagnetic valve driving device according to an embodiment of the present invention.

FIG. 1 is a schematic diagram illustrating a schematic configuration of a fuel injection valve 100 controlled by an electromagnetic valve driving device 1 of the embodiment. The electromagnetic valve driving device 1 of the embodiment is a driving device that drives the fuel injection valve 100. Specifically, the fuel injection valve 100 (electromagnetic valve) that injects fuel into an internal combustion engine mounted on a vehicle is a driving object of the electromagnetic valve driving device 1 of the embodiment.

The fuel injection valve 100 is an electromagnetic valve (solenoid valve) that injects the fuel into an internal combustion engine such as a gasoline engine or a diesel engine mounted on the vehicle. FIG. 1 is a schematic configuration diagram illustrating the fuel injection valve 100. As illustrated in FIG. 1, the fuel injection valve 100 includes a fixed core 101, a valve seat 102, a solenoid coil 103, a needle 104, a valve body 105, a retainer 106, a lower stopper 107, a valve body biasing spring 108, a movable core 109, and a movable core biasing spring 110. In the embodiment, the fixed core 101, the valve seat 102, and the solenoid coil 103 are fixed members. The needle 104, the valve body 105, the retainer 106, the lower stopper 107, the valve body biasing spring 108, the movable core 109, and the movable core biasing spring 110 are movable members.

The fixed core 101 is a cylindrical member, and is fixed to a housing (not illustrated) of the fuel injection valve 100. The fixed core 101 is made of a magnetic material. The valve seat 102 is fixed to the housing of the fuel injection valve 100. The valve seat 102 includes an injection hole 102a. The injection hole 102a is a hole through which the fuel is injected, is closed when the valve body 105 is seated on the valve seat 102, and is open when the valve body 105 is separated from the valve seat 102.

The solenoid coil 103 is formed by winding an electric wire in an annular shape. The solenoid coil 103 is disposed concentrically with the fixed core 101. The solenoid coil 103 is electrically connected to the electromagnetic valve driving device 1. The solenoid coil 103 forms a magnetic path including the fixed core 101 and the movable core 109 by being energized from the electromagnetic valve driving device 1.

The needle 104 is an elongated rod member extending along a central axis of the fixed core 101. The needle 104 is moved in an axial direction of the central axis of the fixed core 101 (an extending direction of the needle 104) by attractive force generated by the magnetic path including the fixed core 101 and the movable core 109.

An installation posture of the fuel injection valve 100 is not particularly limited. However, in the following description, in the axial direction of the central axis of the fixed core 101, a direction in which the movable core 109 moves by the attractive force is referred to as upward, and a direction opposite to the direction in which the movable core 109 moves by the attractive force is referred to as downward.

The valve body 105 is formed at a lower tip of the needle 104. The valve body 105 is seated on the valve seat 102 to close the injection hole 102a, and separated from the valve seat 102 to open the injection hole 102a. The retainer 106 includes a guide member 106a and a flange 106b. The guide member 106a is a cylindrical member fixed to an upper tip of the needle 104. The flange 106b is formed so as to protrude in a radial direction of the needle 104 at an end of the guide member 106a on the upper side. A lower end surface of the flange 106b is a contact surface with the movable core biasing spring 110. An upper end surface of the flange 106b is a contact surface with the valve body biasing spring 108.

The lower stopper 107 is a cylindrical member fixed to the needle 104 between the valve seat 102 and the guide member 106a. An upper end surface of the lower stopper 107 is a contact surface with the movable core 109.

The valve body biasing spring 108 is a compression coil spring accommodated in the fixed core 101, and is interposed between an inner wall surface of the housing and the flange 106b. The valve body biasing spring 108 biases the valve body 105 downward. That is, when the solenoid coil 103 is not energized, the valve body 105 abuts on the valve seat 102 by biasing force of the valve body biasing spring 108.

The movable core 109 is disposed between the guide member 106a and the lower stopper 107. The movable core 109 is a cylindrical member and is provided coaxially with the needle 104. A through-hole through which the needle 104 is inserted is formed at the center of the movable core 109, and the movable core 109 is movable along the extending direction of the needle 104. The upper end surface of the movable core 109 is a contact surface with the fixed core 101 and the movable core biasing spring 110. On the other hand, the lower end surface of the movable core 109 is a contact surface with the lower stopper 107. The movable core 109 is made of a magnetic material.

The movable core biasing spring 110 is a compression coil spring interposed between the flange 106b and the movable core 109. The movable core biasing spring 110 biases the movable core 109 downward. That is, when power is not supplied to the solenoid coil 103, the movable core 109 abuts on the lower stopper 107 by the biasing force of the movable core biasing spring 110.

Figure 2:
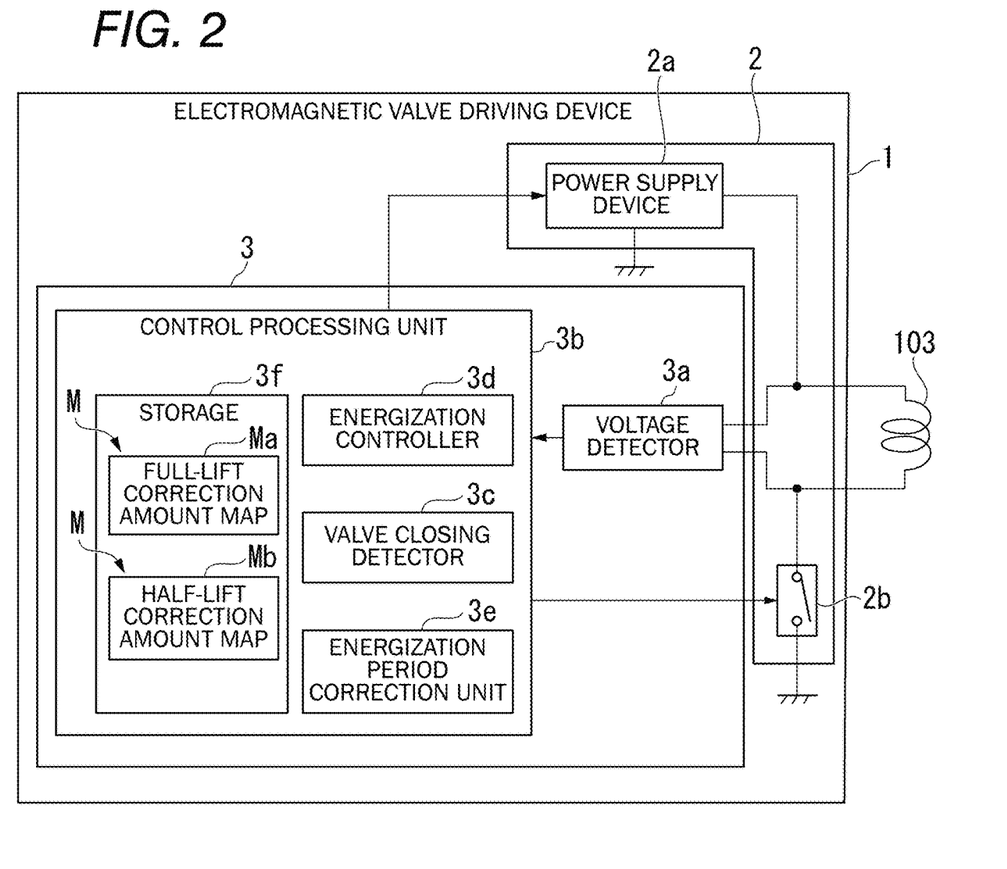
FIG. 2 is a schematic configuration diagram illustrating an electromagnetic valve driving device according to an embodiment of the present invention.

The electromagnetic valve driving device 1 according to the embodiment will be described below. FIG. 2 is a schematic configuration diagram illustrating the electromagnetic valve driving device 1 according to the embodiment. As illustrated in FIG. 2, the electromagnetic valve driving device 1 includes a driving device 2 and a control device 3.

As illustrated in FIG. 2, the driving device 2 includes a power supply device 2a and a switch 2b. The power supply device 2a includes at least one of a battery and a booster circuit. The battery is mounted on the vehicle. The booster circuit boosts a battery voltage Vb that is an output voltage of the battery, and outputs a boosted voltage Vs that is a boosted voltage.

The power supply device 2a may output the battery voltage Vb to the solenoid coil 103 to energize the solenoid coil 103. The power supply device 2a may output the boosted voltage Vs to the solenoid coil 103 to energize the solenoid coil 103. The voltage output from the power supply device 2a to the solenoid coil 103 is controlled by the control device 3. The energization of the solenoid coil 103 is controlled by the control device 3.

An on-state or an off-state of the switch 2b are controlled by the control device 3. When the switch 2b is controlled to the on-state, the voltage output from the power supply device 2a is supplied to the solenoid coil 103. Accordingly, the energization to the solenoid coil 103 is started. When the switch 2b is controlled to the off-state, the supply of the voltage from the power supply device 2a to the solenoid coil 103 is stopped. Accordingly, the energization to the solenoid coil 103 is stopped.

The control device 3 includes a voltage detector 3a and a control processing unit 3b. The voltage detector 3a detects voltage Vc generated in the solenoid coil 103. For example, the voltage Vc is voltage across the solenoid coil 103. The voltage detector 3a outputs the detected voltage Vc to the control processing unit 3b.

The control processing unit 3b includes a valve closing detector 3c, an energization controller 3d, an energization period correction unit 3e, and a storage 3f. The valve closing detector 3c detects the valve closing of the valve body 105. For example, the valve closing detector 3c detects the valve closing of the fuel injection valve 100 based on the voltage Vc detected by the voltage detector 3a. As an example, the valve closing detector 3c detects an inflection point of the voltage Vc detected by the voltage detector 3a, thereby detecting the valve closing of the valve body 105. However, the valve closing detector 3c detects the inflection point of the voltage obtained by processing the voltage Vc detected by the voltage detector 3a by predetermined processing, thereby detecting the valve closing of the valve body 105. A machining voltage may be a differential value of the voltage Vc. In addition, a radio frequency component of the voltage Vc used to detect the valve closing of the valve body 105 may be removed by a filter.

The energization controller 3d controls the power supply device 2a. The energization controller 3d controls the switch 2b to the on-state or the off-state. The energization controller 3d controls the switch 2b to the on-state, whereby the solenoid coil 103 is energized. When the energization controller 3d controls the switch 2b to be in the off-state, the energization to the solenoid coil 103 is stopped. The energization controller 3d controls an energization period Ti based on a program stored in the storage 3f and a later-half correction energization period obtained by the energization period correction unit 3e described later. The energization period Ti indicates a period during which the solenoid coil 103 is energized, and is a time from the start of energization to the solenoid coil 103 at an energization start time T1 to an energization stop time T2 at which the energization is stopped. The control device 3 controls the energization period Ti, thereby controlling an injection amount (hereinafter, referred to as a fuel injection amount) of the fuel injected from the fuel injection valve 100.

The electromagnetic valve driving device 1 of the embodiment performs multi-stage injection control in which the fuel is injected to the fuel injection valve 100 a plurality of times in one combustion cycle (for example, a cycle in which a suction stroke, a compression stroke, a combustion stroke, and an exhaust stroke are sequentially performed once) of the internal combustion engine. In the embodiment, an example in which the fuel injection valve 100 is caused to perform the fuel injection twice in one combustion cycle will be described. In two fuel injections performed in one combustion cycle, the first fuel injection is referred to as a first-half injection. The next fuel injection is referred to as a later-half injection.

The fuel injection valve 100 injects the fuel for each energization period Ti. That is, in the embodiment, two energization periods Ti are provided in one combustion cycle. The first energization period Ti is an energization period for the first-half injection. The first energization period Ti is referred to as a first-half energization period Tia. The next energization period Ti is an energization period for the later-half injection. The next energization period Ti is referred to as a later-half energization period Tib.

In addition, an energization pause period Tp, which is a period during which the energization to the solenoid coil 103 is stopped, is provided between the first-half energization period Tia and the later-half energization period Tib. The energization pause period Tp is a period from the energization stop time T2 of the first-half energization period Tia to the energization start time T1 of the later-half energization period Tib.

The energization period correction unit 3e corrects the later-half energization period Tib based on a later-described correction amount map M stored in the storage 3f. The energization period correction unit 3e refers to the correction amount map M and obtains the correction amount in the later-half energization period Tib based on a command value of the energization pause period Tp. The command value of the energization pause period Tp may be directly acquired from the program as long as the command value is previously stored in the program. The command value of the energization pause period Tp may be calculated based on the energization start time T1 of the later-half energization period Tib from the energization stop time T2 of the first-half energization period Tia.

Furthermore, the energization period correction unit 3e corrects the later-half energization period Tib based on the obtained correction amount. The corrected later-half energization period Tib (hereinafter, referred to as a later-half correction energization period Tib) is input to the energization controller 3d. The energization controller 3d energizes the solenoid coil 103 regarding the later-half injection based on the later-half correction energization period Tib.

At this point, when the multi-stage injection control is performed, the start timing of the later-half injection is made earlier than the design value due to an influence of residual magnetic force after the first-half injection and the increase in the execution boosting voltage. The residual magnetic force is magnetic force remaining in the fuel injection valve 100 due to the influence of the first-half injection. The magnetic force generated in the fuel injection valve 100 by the first-half injection is directed to zero after the first-half injection, but does not become zero immediately. For this reason, sometimes the magnetic force remains in the fuel injection valve 100 at the energization start time T1 of the later-half energization period Tib. The magnetic force remaining in the fuel injection valve 100 at the energization start time T1 in the later-half energization period Tib is residual magnetic force. Due to the influence of the residual magnetic force, the attractive force of the movable core 109 in the later-half injection becomes higher than the design value. Accordingly, the start timing of the later-half injection is set earlier.

The execution boosting voltage is voltage applied to the solenoid coil 103 at the energization start time T1 of the energization period Ti. When the first-half injection is completed, the voltage remaining in the solenoid coil 103 once decreases to a clamp voltage and then returns to zero over time. For this reason, sometimes the voltage of the solenoid coil 103 does not return to zero at the energization start time T1 of the later-half energization period Tib. Due to the influence of the remaining voltage, the boosted voltage applied to the solenoid coil 103 at the energization start time T1 of the later-half energization period Tib becomes higher than the design value. That is, the execution boosting voltage increases. Accordingly, the start timing of the later-half injection is set earlier.

The correction amount map M is a map indicating a relationship between the energization pause period Tp and the correction amount with respect to the later-half energization period Tib. The correction amount is set so as to set the end timing of the later-half injection earlier by the start timing of the later-half injection being set earlier due to the increases in the residual magnetic force and the execution boosting voltage described above. Specifically, when the start timing of the later-half injection is set earlier than the design value by a time Ta, the correction amount is set so as to advance the energization stop time T2 of the later-half energization period Tib by the time Ta such that the later-half energization period Tib is shortened by the time Ta. This correction amount is previously obtained by an experiment or a simulation.

As described above, the influence of the residual magnetic force and the influence of the increase in the execution boosting voltage decrease with the lapse of time. That is, as the energization pause period Tp becomes longer, the degree of the start timing of the later-half injection being set earlier becomes smaller. For this reason, in the correction amount map M, the energization pause period Tp and the correction amount are associated such that the longer the energization pause period Tp, the smaller the correction amount.

In the embodiment, as the correction amount map M, a full-lift correction amount map Ma and a half-lift correction amount map Mb are stored in the storage 3f. The full-lift correction amount map Ma (maximum drive correction amount map) is the correction amount map M used when the fuel injection in one combustion cycle is the full-lift injection. That is, in the embodiment, the full-lift correction amount map Ma is referred to when the first-half injection and the later-half injection are the full-lift injection.

The full-lift injection is fuel injection in which the movable core 109 of the fuel injection valve 100 is moved until abutting on the fixed core 101 in one fuel injection. That is, in the full-lift injection, the movable core 109 is moved to the maximum position in the movable range. That is, the full-lift correction amount map Ma used in such the full-lift injection indicates the relationship between the energization pause period Tp and the correction amount in the later-half energization period Tib when the maximum drive in which the movable core 109 abuts on the fixed core 101 is performed in one fuel injection.

Figure 3:
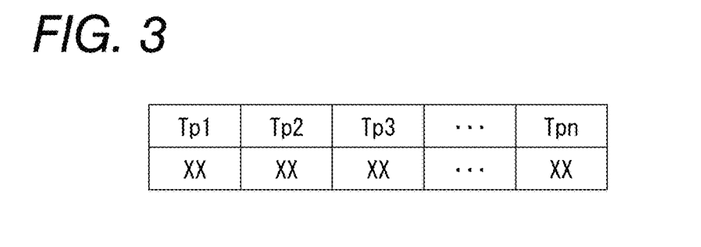
FIG. 3 is a conceptual diagram illustrating a full-lift correction amount map.

FIG. 3 is a conceptual diagram illustrating the full-lift correction amount map Ma. As illustrated in FIG. 3, the full-lift correction amount map Ma is a map illustrating the relationship between the energization pause period Tp and the correction amount in the later-half energization period Tib. In FIG. 3, the correction amount in the later-half energization period Tib is omitted as "XX". For example, as illustrated in FIG. 3, in the full-lift correction amount map Ma, the energization pause period Tp is divided into Tp1 to Tpn for every fixed period. In addition, in the full-lift correction amount map Ma, the correction amount in the later-half energization period Tib is set for each of Tp1 to Tpn.

Figure 4:
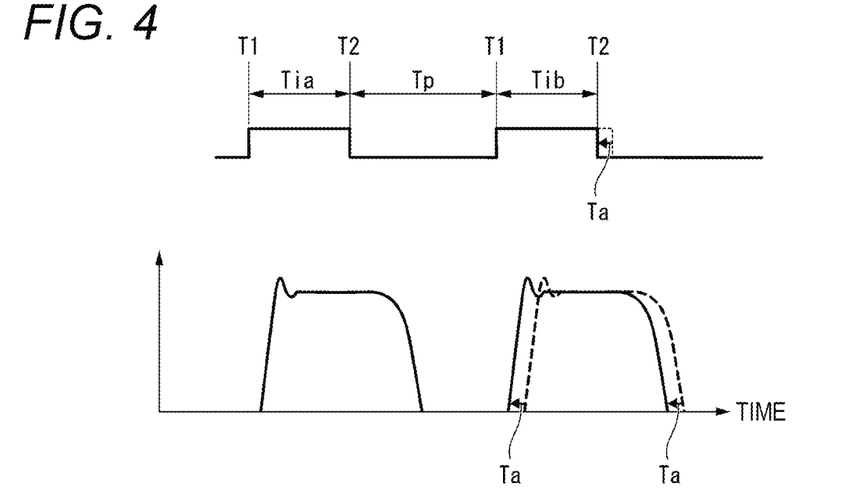
FIG. 4 is a schematic diagram illustrating a state in which a later-half energization period is corrected and shortened using the full-lift correction amount map.

FIG. 4 is a schematic diagram illustrating a state in which the later-half energization period Tib is corrected and shortened using the full-lift correction amount map Ma. In FIG. 4, a temporal change in the voltage energizing the solenoid coil 103 is illustrated in the upper stage, and a temporal change in the movement amount in the movable core 109 from the valve closed state is illustrated in the lower stage. As illustrated in FIG. 4, when the later-half energization period Tib is corrected to be short using the full-lift correction amount map Ma, the time at which the movable core 109 starts moving in the later-half injection is set earlier by the time Ta, and the time at which the movable core 109 returns to the valve closing position is also set earlier by the time Ta. As a result, the difference of the fuel injection amount in the later-half injection with respect to the design value can be reduced.

The half-lift correction amount map Mb (intermediate drive correction amount map) is the correction amount map M used when the fuel injection in one combustion cycle is the half-lift injection. That is, in the embodiment, the half-lift correction amount map Mb is referred to when the first-half injection and the later-half injection are the half-lift injection.

The half-lift injection is fuel injection in which the movable core 109 of the fuel injection valve 100 is not moved until abutting on the fixed core 101 in one fuel injection. That is, in the half-lift injection, the movable core 109 is not moved to the maximum position in the movable range. Such the half-lift injection is also called ballistic injection because the position of the movable core 109 changes so as to draw a parabola with time. In the half-lift injection, the maximum displacement position of the movable core 109 is not limited to the half of the maximum position of the movable core 109 in the full-lift injection.

That is, the half-lift correction amount map Mb used in such the half-lift injection indicates the relationship between the energization pause period Tp and the correction amount in the later-half energization period Tib in the case of performing intermediate drive in which the movable core 109 is not moved until abutting on the fixed core 101 in one fuel injection. In the half-lift correction amount map Mb, the energization pause period Tp and the correction amount are associated with each other according to the value of the first-half energization period Tia.

Figure 5:
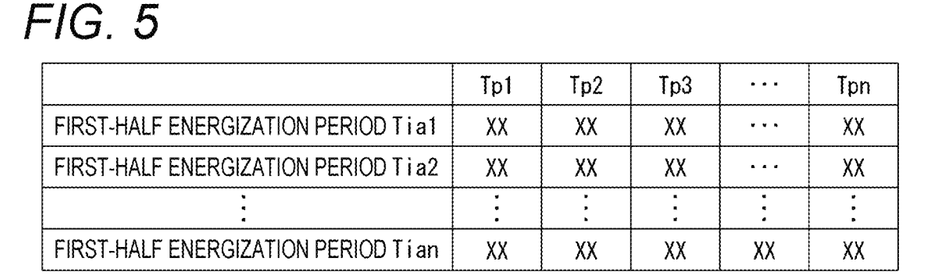
FIG. 5 is a conceptual diagram illustrating a half-lift correction amount map.

FIG. 5 is a conceptual diagram illustrating the half-lift correction amount map Mb. As illustrated in FIG. 5, the half-lift correction amount map Mb is a map illustrating the relationship between the energization pause period Tp and the correction amount in the later-half energization period Tib according to the value of the first-half energization period Tia. In FIG. 5, the correction amount in the later-half energization period Tib is omitted as "XX". For example, as illustrated in FIG. 5, in the half-lift correction amount map Mb, the energization pause period Tp is divided into Tp1 to Tpn for every certain period. In the half-lift correction amount map Mb, the correction amount for the later-half stage energization period Tib is set for each of Tp1 to Tpn.

Furthermore, in the half-lift correction amount map Mb, the first-half energization period Tia is divided into Tia1 to Tian for every fixed period. The energization pause period Tp and the correction amount in the later-half energization period Tib are set for each of Tia1 to Tian. That is, in the half-lift correction amount map Mb, the correction amount in the later-half energization period Tib can be obtained using the first-half energization period Tia and the energization pause period Tp as parameters.

Figure 6:
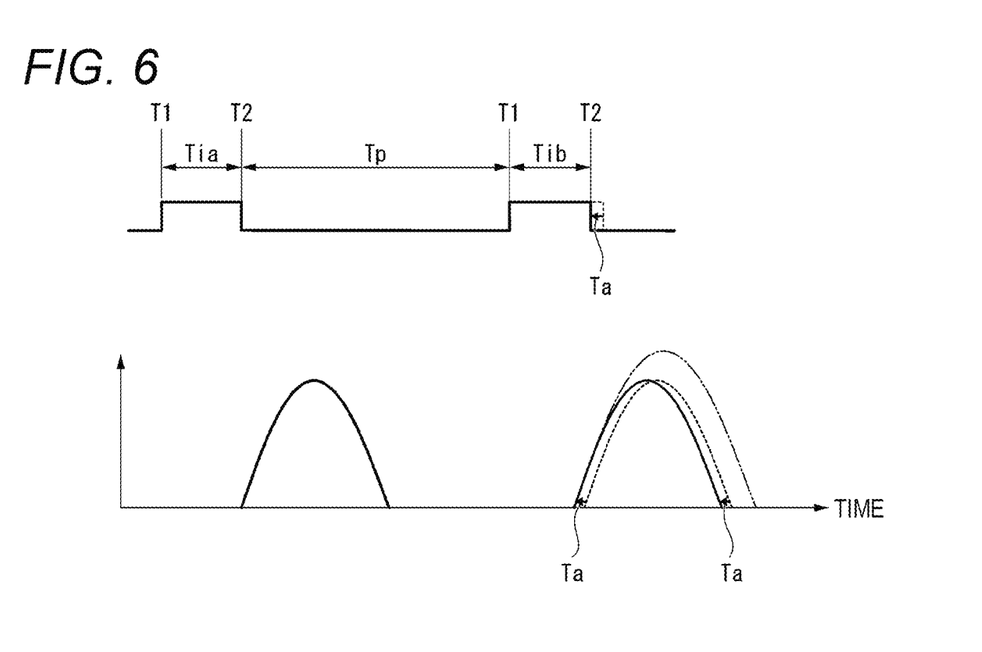
FIG. 6 is a schematic diagram illustrating a state in which the later-half energization period is corrected and shortened using the half-lift correction amount map.

FIG. 6 is a schematic diagram illustrating a state in which the later-half energization period Tib is corrected and shortened using the half-lift correction amount map Mb. In FIG. 6, a temporal change in the voltage energizing the solenoid coil 103 is illustrated in the upper stage, and a temporal change in the movement amount of the movable core 109 from the valve closed state is illustrated in the lower stage. As illustrated in FIG. 6, when the later-half energization period Tib is corrected to be short using the half-lift correction amount map Mb, the time at which the movable core 109 starts moving in the later-half injection is set earlier by the time Ta, and the time at which the movable core 109 returns to the valve closing position is also set earlier by the time Ta. As a result, the difference of the fuel injection amount in the later-half injection with respect to the design value can be reduced.

When the multi-stage injection control is performed by the half-lift injection, the residual magnetic force of the fuel injection valve 100 greatly differs depending on the value of the first-half energization period Tia. For this reason, in the half-lift correction amount map Mb, the energization pause period Tp and the correction amount in the later-half energization period Tib are associated with each other according to the value of the first-half energization period Tia, so that the difference of the fuel injection amount of the later-half injection with respect to the design value can be more reliably reduced.

The storage 3f stores the above-described correction amount map M. In the embodiment, the storage 3f stores the full-lift correction amount map Ma and the half-lift correction amount map Mb as the correction amount map M. The storage 3f stores a drive control program of the fuel injection valve 100 and various arithmetic values.

Figure 7:
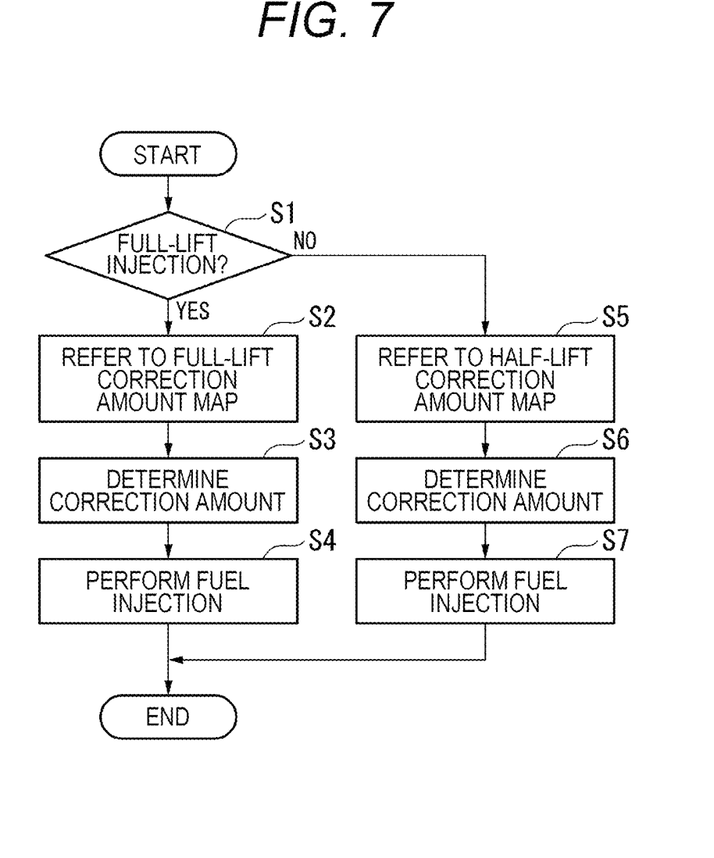
FIG. 7 is a flowchart illustrating operation of the electromagnetic valve driving device according to an embodiment of the present invention.

Subsequently, an example of the operation of the control processing unit 3b in the multi-stage injection control will be described with reference to FIG. 7. FIG. 7 is a flowchart illustrating the example of the operation of the control processing unit 3b in the multi-stage injection control.

As illustrated in FIG. 7, the control processing unit 3b determines whether a plurality of fuel injections in one combustion cycle are the full-lift injection (step S1). At this point, the energization period correction unit 3e determines whether the fuel injection is the full-lift injection based on the program stored in the storage 3f or a command input from the outside.

When it is determined in step S1 that the injection is the full-lift injection, the energization period correction unit 3e refers to the full-lift correction amount map Ma (step S2). Subsequently, the energization period correction unit 3e determines the correction amount in the later-half energization period Tib (step S3). At this point, the energization period correction unit 3e obtains a command value of the energization pause period Tp based on a program stored in the storage 3f or the command input from the outside. The energization period correction unit 3e refers to the full-lift correction amount map Ma to determine the correction amount in the later-half energization period Tib based on the command value of the energization pause period Tp.

Thereafter, the control processing unit 3b causes the fuel injection valve 100 to perform the fuel injection based on the correction amount in the later-half energization period Tib determined in step S3 (step S4). At this point, the energization period correction unit 3e corrects the later-half energization period Tib based on the correction amount obtained in step S3 to generate the later-half correction energization period Tib. The energization controller 3d energizes the solenoid coil 103 based on the first-half energization period Tia based on the program stored in the storage 3f and the later-half correction energization period Tib obtained by the energization period correction unit 3e. Accordingly, the fuel injection valve 100 injects fuel in multiple stages.

On the other hand, when it is determined in step S1 that the fuel injection is not the full-lift injection, the fuel injection is the half-lift injection. For this reason, the energization period correction unit 3e refers to the half-lift correction amount map Mb (step S5). Subsequently, the energization period correction unit 3e determines the correction amount in the later-half energization period Tib (step S6). At this point, the energization period correction unit 3e obtains a command value of the energization pause period Tp based on a program stored in the storage 3f or the command input from the outside. In addition, the energization period correction unit 3e obtains the command value of the first-half energization period Tia based on the program stored in the storage 3f or the command input from the outside. The energization period correction unit 3e refers to the half-lift correction amount map Mb and determines the correction amount in the later-half energization period Tib based on the command value of the energization pause period Tp and the command value of the first-half energization period Tia.

Thereafter, the control processing unit 3b causes the fuel injection valve 100 to perform the fuel injection based on the correction amount in the later-half energization period Tib determined in step S6 (step S7). At this point, the energization period correction unit 3e corrects the later-half energization period Tib based on the correction amount obtained in step S6 to generate the later-half correction energization period Tib. The energization controller 3d energizes the solenoid coil 103 based on the first-half energization period Tia based on the program stored in the storage 3f and the later-half correction energization period Tib obtained by the energization period correction unit 3e. Accordingly, the fuel injection valve 100 injects fuel in multiple stages.

The electromagnetic valve driving device 1 of the embodiment as described above controls the energization period Ti to the solenoid coil 103 provided in the fuel injection valve 100. The electromagnetic valve driving device 1 of the embodiment injects fuel to the fuel injection valve 100 a plurality of times during one combustion cycle of the internal combustion engine. The electromagnetic valve driving device 1 of the embodiment includes a storage 3f, an energization period correction unit 3e, and an energization controller 3d. The storage 3f stores the correction amount map M indicating the relationship between the energization pause period Tp from the completion time of the first-half energization period Tia, which is the energization period Ti for the first fuel injection in one combustion cycle, to the start time of the later-half energization period Tib, which is the energization period Ti for the next fuel injection, and the correction amount for the later-half energization period Tib. The energization period correction unit 3e obtains the correction amount from the command value of the energization pause period Tp based on the correction amount map M, and corrects the later-half energization period Tib based on the obtained correction amount. The energization controller 3d energizes the solenoid coil 103 based on the later-half correction energization period Tib that is the later-half energization period Tib corrected by the energization period correction unit 3e.

In the electromagnetic valve driving device 1 of the embodiment, the storage 3f stores the correction amount map M indicating the relationship between the energization pause period Tp and the correction amount in the later-half energization period Tib. In addition, the correction amount in the later-half energization period Tib is obtained from the command value of the energization pause period Tp based on the correction amount map M. For this reason, an increase in the load of arithmetic processing is prevented as compared with the case of obtaining the correction amount in the later-half energization period Tib without using the correction amount map M. Consequently, the electromagnetic valve driving device 1 of the embodiment can prevent the increase in the load of the arithmetic processing due to the correction regarding the fuel injection.

The fuel injection valve 100 includes the movable core 109 and the fixed core 101. The movable core 109 is moved by the energization to the solenoid coil 103. The fixed core 101 abuts on the movable core 109 at the maximum movement position of the movable core 109. In the electromagnetic valve driving device 1 of the embodiment, the storage 3f stores the full-lift correction amount map Ma as the correction amount map M. The full-lift correction amount map Ma indicates the relationship between the energization pause period Tp and the correction amount when the maximum drive (full-lift injection) in which the movable core 109 abuts on the fixed core 101 is performed in one fuel injection. When the fuel injection (first-half injection) based on the first-half energization period Tia and the fuel injection (later-half injection) based on the later-half energization period Tib are the maximum drive (full-lift injection), the energization period correction unit 3e obtains the correction amount from the command value of the energization pause period Tp based on the full-lift correction amount map Ma.

The electromagnetic valve driving device 1 of the embodiment can correct the later-half energization period Tib using the full-lift correction amount map Ma suitable for characteristics of the residual magnetic force in the full-lift injection and of the increase in the execution boosting voltage. For this reason, the electromagnetic valve driving device 1 of the embodiment can further reduce the difference between the fuel injection amount in the later-half injection of the full-lift injection and the design value.

In the electromagnetic valve driving device 1 of the embodiment, the storage 3f stores the half-lift correction amount map Mb as the correction amount map M. The half-lift correction amount map Mb indicates the relationship between the energization pause period Tp and the correction amount in the case of performing intermediate drive (half-lift injection) in which the movable core 109 is not moved until abutting on the fixed core 101 in one fuel injection. When the first-half injection and the later-half injection are intermediate drive (half-lift injection), the energization period correction unit 3e obtains the correction amount from the command value of the energization pause period Tp based on the half-lift correction amount map Mb.

The electromagnetic valve driving device 1 of the embodiment can correct the later-half energization period Tib using the half-lift correction amount map Mb suitable for characteristics of the residual magnetic force in the half-lift injection and of the increase in the execution boosting voltage. For this reason, the electromagnetic valve driving device 1 of the embodiment can further reduce the difference between the fuel injection amount in the later-half injection of the half-lift injection and the design value.

In the electromagnetic valve driving device 1 of the embodiment, the storage 3f stores the full-lift correction amount map Ma and the half-lift correction amount map Mb. The energization period correction unit 3e determines whether the fuel injection is the full-lift injection or the half-lift injection. When the first-half injection and the later-half injection are the full-lift injection, the energization period correction unit 3e obtains the correction amount from the command value of the energization pause period Tp based on the full-lift correction amount map Ma. When the first-half injection and the later-half injection are the half-lift injection, the energization period correction unit 3e obtains the correction amount from the command value of the energization pause period Tp based on the half-lift correction amount map Mb.

The electromagnetic valve driving device 1 of the embodiment can select the correction amount map M suitable for each characteristics and correct the later-half energization period Tib even when the fuel injection of the fuel injection valve 100 is either the full-lift injection or the half-lift injection.

In the electromagnetic valve driving device 1 of the embodiment, the half-lift correction amount map Mb indicates the relationship between the energization pause period Tp and the correction amount in the later-half energization period Tib according to the value of the first-half energization period Tia. In the above embodiment, the half-lift correction amount map Mb indicates the relationship between the energization pause period Tp and the correction amount in the later-half energization period Tib for each period in the first-half energization period Tia. Furthermore, the energization period correction unit 3e obtains the correction amount from the command value of the first-half energization period Tia and the command value of the energization pause period Tp. In the half-lift injection, the degree of influence on the later-half injection greatly varies depending on the value of the first-half energization period Tia. For this reason, when such the half-lift correction amount map Mb is used, correction of the later-half energization period Tib suitable for the value of the first-half energization period Tia can be performed.

Furthermore, in the electromagnetic valve driving device 1 of the embodiment, the energization pause period Tp and the correction amount are associated with each other such that the valve closing timing in the later-half injection is set earlier according to the valve opening timing in the later-half injection being set earlier caused by at least one of the residual magnetic force due to the influence of the first-half injection and the increase in the execution boosting voltage. For this reason, the electromagnetic valve driving device 1 of the embodiment can prevent the increase in the fuel injection amount due to the residual magnetic force due to the influence of the first-half injection and the increase in the execution boosting voltage.

Although the preferred embodiment of the present invention have been described above with reference to the accompanying drawings, it goes without saying that the present invention is not limited to the above embodiment. Various shapes, combinations, and the like of the constituent members illustrated in the above-described embodiment are merely examples, and various modifications can be made based on design requirements and the like without departing from the gist of the present invention.

In the above embodiment, the example in which the fuel injection is performed twice in one combustion cycle has been described. However, the present invention is not limited thereto. In one combustion cycle, the fuel injection may be performed at least three times. In such a case, the same control as in the above embodiment can be performed by setting the first fuel injection of two fuel injections that are temporally continuous as the first-half injection and setting the second fuel injection (next fuel injection) as the later-half injection.

Figure 8:
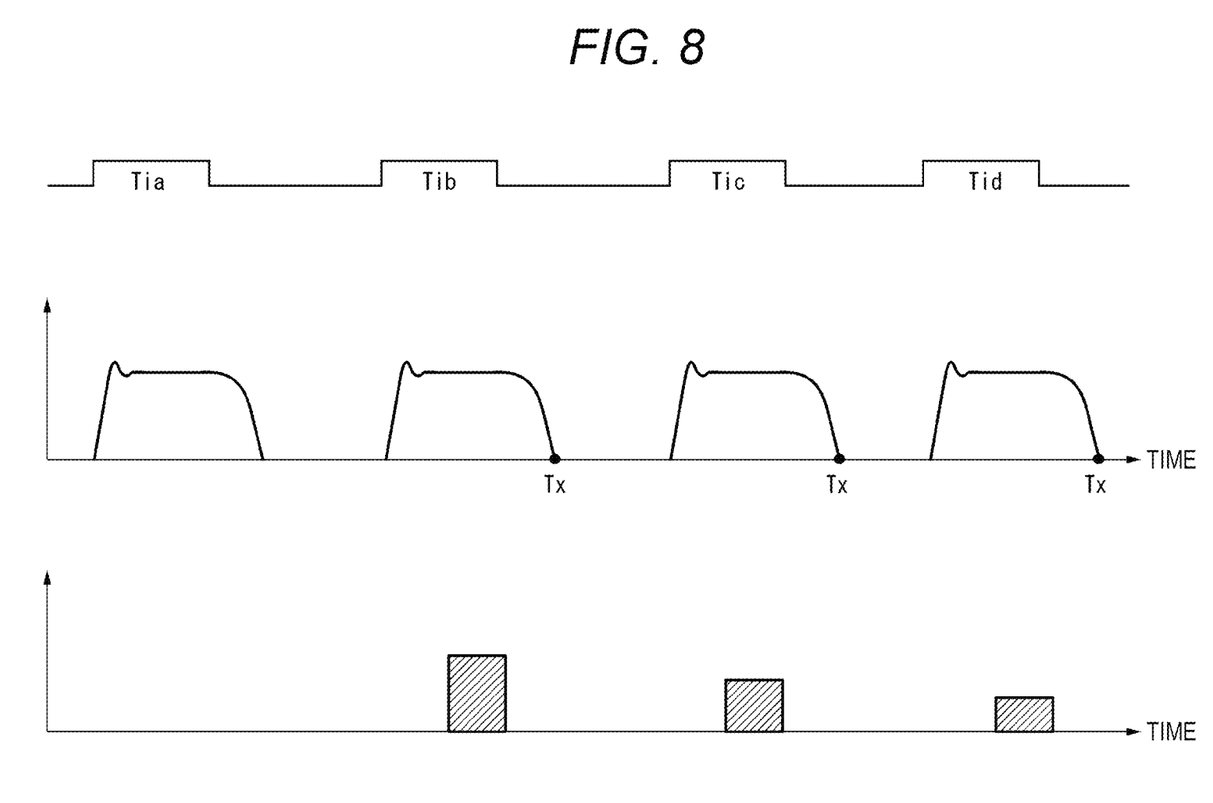
FIG. 8 is a schematic diagram illustrating a state when fuel injection is performed at least three times in one fuel cycle in a modification of the electromagnetic valve driving device according to an embodiment of the present invention.

FIG. 8 is a schematic diagram illustrating a state when the fuel injection is performed at least three times in one fuel cycle. In FIG. 8, the temporal change of the voltage energizing the solenoid coil 103 is illustrated in the upper stage, the temporal change of the movement amount of the movable core 109 from the valve closed state is illustrated in the middle stage, and the variation amount of the fuel injection amount with respect to the design value is illustrated in the lower stage. As illustrated in FIG. 8, for example, when the fuel injection is performed at least three times in one fuel cycle, a valve closing detection time Tx when the fuel injection is performed may be detected by the valve closing detector 3c based on the corrected later-half energization period Tib, and a difference from the estimated valve closing time obtained from the corrected later-half energization period Tib may be calculated. The later-half correction energization period after the difference is calculated may be further corrected based on the difference. When the later-half correction energization period is further corrected in this manner, an individual difference of the fuel injection valve 100 and fluctuations of the fuel injection amount from the design value due to temperature and fuel pressure can be prevented.

REFERENCE SIGNS LIST

1 electromagnetic valve driving device
3c valve closing detector
3d energization controller
3e energization period correction unit
3f storage
100 fuel injection valve
101 fixed core
103 solenoid coil
109 movable core
M correction amount map
Ma full-lift correction amount map
Mb half-lift correction amount map
T1 energization start time
T2 energization stop time
Ti energization period
Tia first-half energization period
Tib later-half energization period (later-half correction energization period)
Tp energization pause period
Tx valve closing detection time

The invention claimed is:

1. An electromagnetic valve driving device that controls an energization period to a solenoid coil provided in a fuel injection valve and causes the fuel injection valve to inject fuel a plurality of times during one combustion cycle of an internal combustion engine, the electromagnetic valve driving device comprising:

a storage that stores a correction amount map indicating a relationship between an energization pause period from a completion time of a first-half energization period, which is the energization period for a first fuel injection in the one combustion cycle, to a start time of a later-half energization period, which is the energization period for next fuel injection, and a correction amount for the later-half energization period;

an energization period correction unit that obtains the correction amount from a command value of the energization pause period based on the correction amount map and corrects the later-half energization period based on the obtained correction amount; and an energization controller that energizes the solenoid coil based on a later-half correction energization period that is the later-half energization period corrected by the energization period correction unit, wherein the energization pause period and the correction amount are associated with each other such that valve closing timing in the next fuel injection is set earlier according to valve opening timing in the next fuel injection being set earlier caused by at least one of residual magnetic force due to an influence of the first fuel injection and an increase in an execution boosting voltage.

2. The electromagnetic valve driving device according to claim 1, wherein the fuel injection valve includes a movable core that is moved by energization to the solenoid coil and a fixed core that abuts on the movable core at a maximum movement position of the movable core, the storage stores, as the correction amount map, a maximum drive correction amount map indicating a relationship between the energization pause period and the correction amount when maximum drive in which the movable core abuts on the fixed core is performed in one fuel injection and an intermediate drive correction amount map indicating the relationship between the energization pause period and the correction amount when intermediate drive in which the movable core is not moved until abutting on the fixed core is performed in one fuel injection, and the energization period correction unit determines whether the fuel injection is the maximum drive or the intermediate drive, obtains the correction amount from the command value of the energization pause period based on the maximum drive correction amount map when the fuel injection based on the first-half energization period and the fuel injection based on the later-half energization period are the maximum drive, and obtains the correction amount from the command value of the energization pause period based on the intermediate drive correction amount map when the fuel injection based on the first-half energization period and the fuel injection based on the later-half energization period are the intermediate drive.

3. The electromagnetic valve driving device according to claim 1, further comprising a valve closing detector that detects valve closing of the fuel injection valve, wherein the energization period correction unit calculates a difference between an estimated valve closing time obtained from the later-half correction energization period and a valve closing detection time obtained by the valve closing detector, and further corrects the later-half correction energization period after the calculation of the difference.

4. An electromagnetic valve driving device that controls an energization period to a solenoid coil provided in a fuel injection valve and causes the fuel injection valve to inject fuel a plurality of times during one combustion cycle of an internal combustion engine, the electromagnetic valve driving device comprising:

a storage that stores a correction amount map indicating a relationship between an energization pause period from a completion time of a first-half energization period, which is the energization period for a first fuel injection in the one combustion cycle, to a start time of a later-half energization period, which is the energization period for next fuel injection, and a correction amount for the later-half energization period;

an energization period correction unit that obtains the correction amount from a command value of the energization pause period based on the correction amount map and corrects the later-half energization period based on the obtained correction amount; and an energization controller that energizes the solenoid coil based on a later-half correction energization period that is the later-half energization period corrected by the energization period correction unit, wherein the fuel injection valve includes the movable core that is moved by the energization to the solenoid coil and the fixed core that abuts on the movable core at the maximum movement position of the movable core, the storage stores, as the correction amount map, an intermediate drive correction amount map indicating the relationship between the energization pause period and the correction amount when intermediate drive in which the movable core is not moved until abutting on the fixed core is performed in one fuel injection, and the energization period correction unit obtains the correction amount from the command value of the energization pause period based on the intermediate drive correction amount map when the fuel injection based on the first-half energization period and the fuel injection based on the later-half energization period are the intermediate drive.

5. The electromagnetic valve driving device according to claim 4, wherein the intermediate drive correction amount map indicates a relationship between the energization pause period and the correction amount according to the first-half energization period, and the energization period correction unit obtains the correction amount from the command value of the first-half energization period and the command value of the energization pause period.

6. An electromagnetic valve driving device that controls an energization period to a solenoid coil provided in a fuel injection valve and causes the fuel injection valve to inject fuel a plurality of times during one combustion cycle of an internal combustion engine, the electromagnetic valve driving device comprising:

a storage that stores a correction amount map indicating a relationship between an energization pause period from a completion time of a first-half energization period, which is the energization period for a first fuel injection in the one combustion cycle, to a start time of a later-half energization period, which is the energization period for next fuel injection, and a correction amount for the later-half energization period;

an energization period correction unit that obtains the correction amount from a command value of the energization pause period based on the correction amount map and corrects the later-half energization period based on the obtained correction amount; and an energization controller that energizes the solenoid coil based on a later-half correction energization period that is the later-half energization period corrected by the energization period correction unit, wherein the fuel injection valve includes a movable core that is moved by energization to the solenoid coil and a fixed core that abuts on the movable core at a maximum movement position of the movable core, the storage stores, as the correction amount map, a maximum drive correction amount map indicating a relationship between the energization pause period and the correction amount when maximum drive in which the movable core abuts on the fixed core is performed in one fuel injection, and the energization period correction unit obtains the correction amount from the command value of the energization pause period based on the maximum drive correction amount map when the fuel injection based on the first-half energization period and the fuel injection based on the later-half energization period are the maximum drive.

* * * * *